(12) United States Patent
Walden

(10) Patent No.: US 11,110,746 B2
(45) Date of Patent: Sep. 7, 2021

(54) WORK VEHICLE

(71) Applicant: KUBOTA CORPORATION, Osaka (JP)

(72) Inventor: Robert Walden, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 6 days.

(21) Appl. No.: 15/963,427

(22) Filed: Apr. 26, 2018

(65) Prior Publication Data
US 2019/0329589 A1    Oct. 31, 2019

(51) Int. Cl.
*B60B 33/00* (2006.01)
*A01D 101/00* (2006.01)
*A01D 34/66* (2006.01)

(52) U.S. Cl.
CPC ...... *B60B 33/0028* (2013.01); *B60B 33/0049* (2013.01); *B60B 33/0068* (2013.01); *A01D 34/66* (2013.01); *A01D 2101/00* (2013.01); *B60B 33/0005* (2013.01); *B60B 33/0026* (2013.01); *B60B 2900/211* (2013.01); *B60B 2900/212* (2013.01); *B60Y 2200/223* (2013.01)

(58) Field of Classification Search
CPC ............ B60B 33/0028; B60B 33/0068; B60B 33/0049; B60B 33/0005; B60B 33/0026; B60B 2900/212; B60B 2900/211; B60B 33/0015; A01D 2101/00; A01D 34/66; B60Y 2200/223; Y10T 16/216; Y10T 16/203
See application file for complete search history.

(56) References Cited

U.S. PATENT DOCUMENTS

| | | | | |
|---|---|---|---|---|
| 394,310 A | * | 12/1888 | Sullivan | B60B 33/0002 16/31 R |
| 860,650 A | * | 7/1907 | Fletcher | B60B 33/00 16/41 |
| 1,275,882 A | * | 8/1918 | Ellison | B60B 33/00 16/18 CG |
| 1,285,142 A | * | 11/1918 | Happensack | B60B 33/00 16/18 CG |
| 1,731,640 A | * | 10/1929 | Truman | B60B 33/06 16/34 |
| 2,129,579 A | * | 9/1938 | Herold | B60B 33/0002 16/18 CG |
| 2,170,257 A | * | 8/1939 | Andersen | B60B 33/00 16/31 R |
| 2,450,062 A | * | 9/1948 | Voss | B60B 33/00 16/18 CG |
| 2,659,100 A | * | 11/1953 | Cramer | B60B 33/0002 16/22 |

(Continued)

*Primary Examiner* — Paul N Dickson
*Assistant Examiner* — Timothy Wilhelm
(74) *Attorney, Agent, or Firm* — Greenblum & Bernstein, P.L.C.

(57) ABSTRACT

A work vehicle includes a pair of left and right pivotal connecting units provided on a front frame, a caster wheel, a caster axle and a caster bracket connected to the pivotal connecting unit. The caster bracket includes side walls supporting the caster axle, a top wall extending rearwards from the upper side of the caster wheel and interconnecting the left side wall and the right side wall, and left and right cover portions for covering gaps between the side walls and the caster wheel.

18 Claims, 4 Drawing Sheets

(56) References Cited

U.S. PATENT DOCUMENTS

| | | | | | |
|---|---|---|---|---|---|
| 2,810,925 | A | * | 10/1957 | Meyerhoefer | A47L 9/009 16/18 R |
| 2,981,969 | A | * | 5/1961 | Fontana | B60B 33/00 16/18 CG |
| 2,996,752 | A | * | 8/1961 | Pope | B60B 33/0002 16/18 R |
| 3,166,780 | A | * | 1/1965 | Schultz, Jr. | B60B 33/0002 16/21 |
| 3,184,783 | A | * | 5/1965 | Brigham | B60B 33/00 16/18 R |
| 3,349,426 | A | * | 10/1967 | Haydock | B60B 33/08 16/46 |
| 3,486,185 | A | * | 12/1969 | Lange | B60B 33/00 16/18 R |
| 3,691,590 | A | * | 9/1972 | Drabert | B60B 33/00 16/18 R |
| 3,818,541 | A | * | 6/1974 | Daniels | B60B 33/00 16/18 A |
| 3,847,665 | A | * | 11/1974 | Quint | B60S 3/042 134/6 |
| 3,977,040 | A | * | 8/1976 | Sugasawara | B60B 33/0028 16/45 |
| 4,025,099 | A | * | 5/1977 | Virden | B60B 33/00 293/58 |
| 4,457,045 | A | * | 7/1984 | Kegg | B60B 33/0052 16/18 A |
| 4,667,366 | A | * | 5/1987 | Melara | B60B 33/0002 16/31 R |
| 4,869,054 | A | * | 9/1989 | Hostetler | A01D 34/866 56/6 |
| 5,134,753 | A | * | 8/1992 | Rekuc | A45C 5/14 16/18 CG |
| 5,136,751 | A | * | 8/1992 | Coyne | B60B 33/00 16/29 |
| 5,275,472 | A | * | 1/1994 | Hicks | B60B 33/0028 301/105.1 |
| 5,507,069 | A | * | 4/1996 | Willis | B60B 33/00 16/18 R |
| 5,615,450 | A | * | 4/1997 | Butler | B60B 33/00 16/18 CG |
| 5,690,395 | A | * | 11/1997 | Hicks | B60B 33/0028 301/105.1 |
| 6,076,641 | A | * | 6/2000 | Kinzer | A45C 5/14 16/18 CG |
| 6,125,504 | A | * | 10/2000 | Richards | B60B 33/00 16/18 CG |
| 6,332,240 | B1 | * | 12/2001 | Wu | B60B 33/001 16/18 B |
| 6,594,856 | B1 | * | 7/2003 | Cherukuri | B60B 33/0005 16/32 |
| 6,601,806 | B2 | * | 8/2003 | Wing | B60B 1/006 16/19 |
| 6,725,501 | B2 | * | 4/2004 | Harris | B60B 33/0007 16/31 A |
| 7,143,472 | B2 | * | 12/2006 | Hicks | B60B 7/00 16/18 CG |
| 7,152,389 | B2 | * | 12/2006 | Melone | A01D 34/64 56/15.8 |
| 7,478,819 | B1 | * | 1/2009 | Boraas | B60B 33/0002 16/30 |
| D593,400 | S | * | 6/2009 | Jones | D8/375 |
| 7,614,114 | B1 | * | 11/2009 | Bucher | B60B 33/0002 16/29 |
| 7,698,780 | B2 | * | 4/2010 | Yan | B60B 33/0057 16/35 R |
| 8,020,679 | B2 | * | 9/2011 | Wu | A45C 5/143 190/18 A |
| 8,087,127 | B2 | * | 1/2012 | Dayt | B60B 33/0073 16/47 |
| 8,191,289 | B2 | * | 6/2012 | Raftery | E01H 5/12 37/271 |
| 8,336,282 | B2 | * | 12/2012 | Messina | B60L 50/66 56/320.1 |
| 8,484,801 | B2 | * | 7/2013 | Li | B60B 33/0007 16/32 |
| 8,646,952 | B2 | | 2/2014 | Walden et al. | |
| 8,904,597 | B2 | * | 12/2014 | Long | B60B 33/0015 16/18 CG |
| 9,027,204 | B2 | * | 5/2015 | Frame | B60B 33/0021 16/47 |
| 9,433,152 | B2 | * | 9/2016 | Bucharzewski | B60B 33/0005 |
| 9,827,843 | B2 | * | 11/2017 | Block | B60B 19/12 |
| 10,023,007 | B2 | * | 7/2018 | Horch | B60R 19/00 |
| 10,035,499 | B2 | * | 7/2018 | Lovelady | B60T 3/00 |
| 2005/0155188 | A1 | * | 7/2005 | Wang | A45C 5/14 16/440 |
| 2006/0267295 | A1 | * | 11/2006 | You | B60B 33/0078 280/5.28 |
| 2013/0180080 | A1 | * | 7/2013 | Tsai | B60B 33/0007 16/43 |
| 2018/0281718 | A1 | * | 10/2018 | Barker | B60B 33/00 |
| 2018/0319214 | A1 | * | 11/2018 | Renno | B60B 33/0057 |
| 2019/0070899 | A1 | * | 3/2019 | Hugues | B60B 33/006 |

\* cited by examiner

WORK VEHICLE

TECHNICAL FIELD

This invention relates to a work vehicle having driving type rear wheels and caster type front wheels.

BACKGROUND ART

U.S. Pat. No. 8,646,952 discloses a zero-turn mower including caster wheels as front wheels and the mower can make a turn by a pair of left and right rear wheels to which power is transmitted independently of each other. Caster mounts are provided on left and right sides of a front portion of a frame unit which constitutes a vehicle body of the zero turn mower. Each caster mount includes a housing sleeve in which a swivel post disposed vertically on a caster bracket is rotatably inserted. The caster bracket is a U-shaped bracket having two arms extending downwards, between which a caster wheel is held to be rotatable about a horizontal axis.

The above-described caster bracket is provided for the purpose of holding a caster axle only, so it is manufactured by bending a plate member having a relatively narrow width into the U-shape. When seen in its front view, the caster axle protruding from the caster wheel is exposed between the caster wheel and the arms of the caster bracket. Therefore, during a work run, high grass or low tree piece or the like may enter the gaps between the caster wheel and the caster bracket arms, thus giving damage to the caster axle. Moreover, there is another problem that an object (e.g. a pebble, grass, etc.) flung up by the caster wheel may fall onto a vehicle body equipment such as a mower unit.

SUMMARY OF THE INVENTION

The object of the present invention is to provide a work vehicle that can effectively suppress damage to the caster wheel and fall of an object flung by the caster wheel onto a vehicle equipment during a work run of the vehicle.

For accomplishing the above object, a work vehicle according to the present invention comprise:
a driving rear wheel unit;
a front frame extending in a vehicle body transverse direction;
a pair of left and right pivotal connecting units provided on the front frame;
a caster wheel;
a caster axle; and
a caster bracket connected to the pivotal connecting unit, the caster bracket including:
a left side wall that supports a left end portion of the caster axle;
a right side wall that supports a right end portion of the caster axle;
a top wall extending rearwards from the upper side of the caster wheel and interconnecting the left side wall and the right side wall;
a left cover portion that extends from the left side wall to a left side face of the caster wheel for covering the left side face of the caster axle; and
a right cover portion that extends from the right side wall to a right side face of the caster wheel for covering the right side face of the caster axle.

With above-described arrangement, the left cover portion and the right cover portion prevent high grass or low tree piece or the like that advances toward between the caster wheels and the caster brackets from coming into contact with the caster wheels in the course of a work run. Further, an object flung up by the caster wheel to advance toward a vehicle body equipment disposed rearwardly of this caster wheel will hit against and be dropped by the top wall which extends from the upper side to the rear side, thus being effectively prevented from reaching the vehicle body equipment. With this, damage to the caster axle by e.g. high grass or low tree piece etc. can be suppressed, and accumulation of foreign object or substance flung up by the caster wheel on the vehicle body equipment can be suppressed also.

DETAILED DESCRIPTION

Next, with reference to the drawings, one specific embodiment of a work vehicle according to the present invention will be described. In this detailed description, unless indicated otherwise, a word "front" means a front side with respect to a vehicle body front-rear direction (running direction), and a word "rear" means a rear side with respect to the vehicle body front-rear direction (running direction). Further, a left-right direction or a lateral direction means a vehicle body transverse direction (vehicle body width direction) perpendicular to the vehicle body front-rear direction. Also, a word "upper" or "lower" signifies a positional relationship in the perpendicular direction of the vehicle body (perpendicular direction), thus indicating a relationship respecting the ground height.

Figure 1:
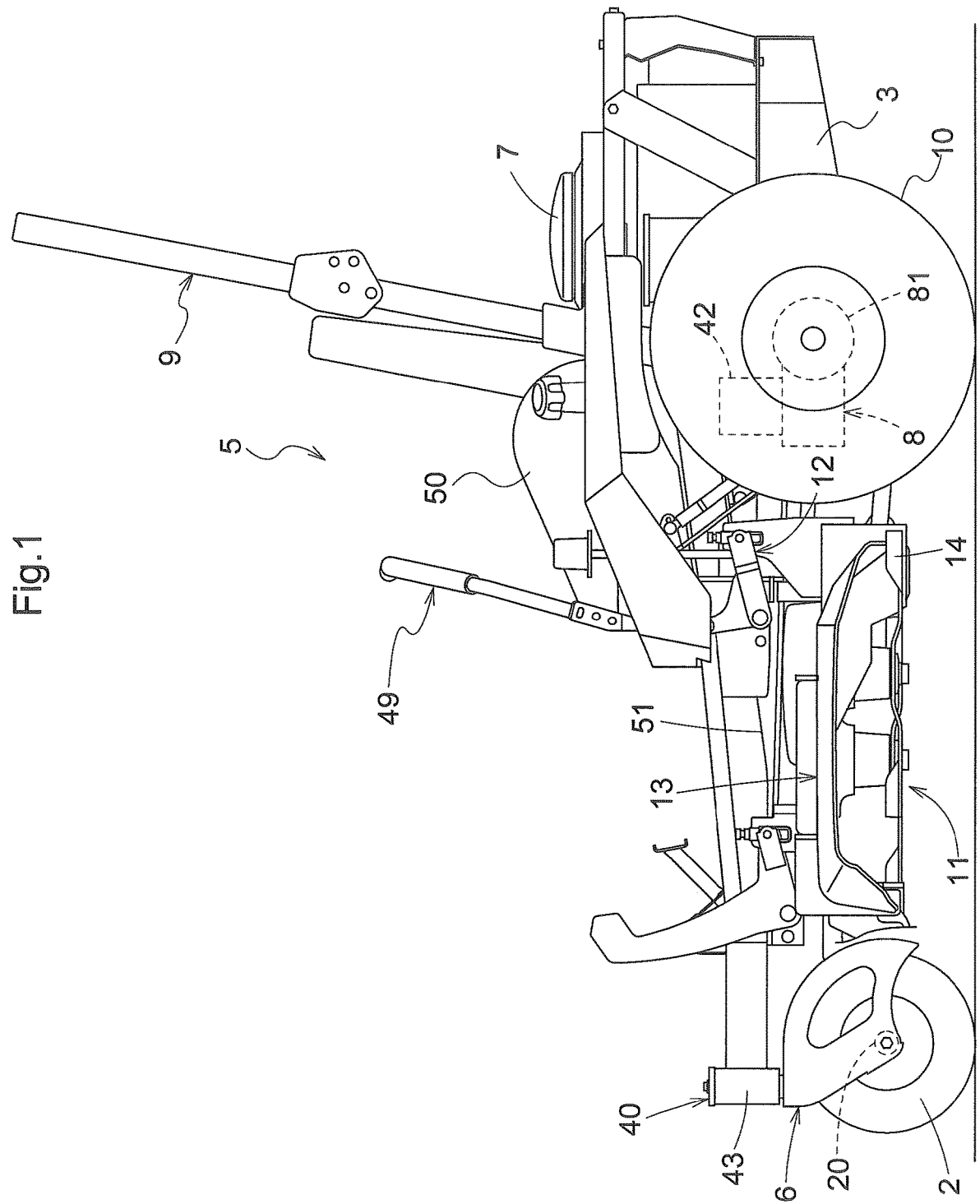
FIG. 1 is a side view of a zero-turn mower as one example of a work vehicle.
Figure 2:
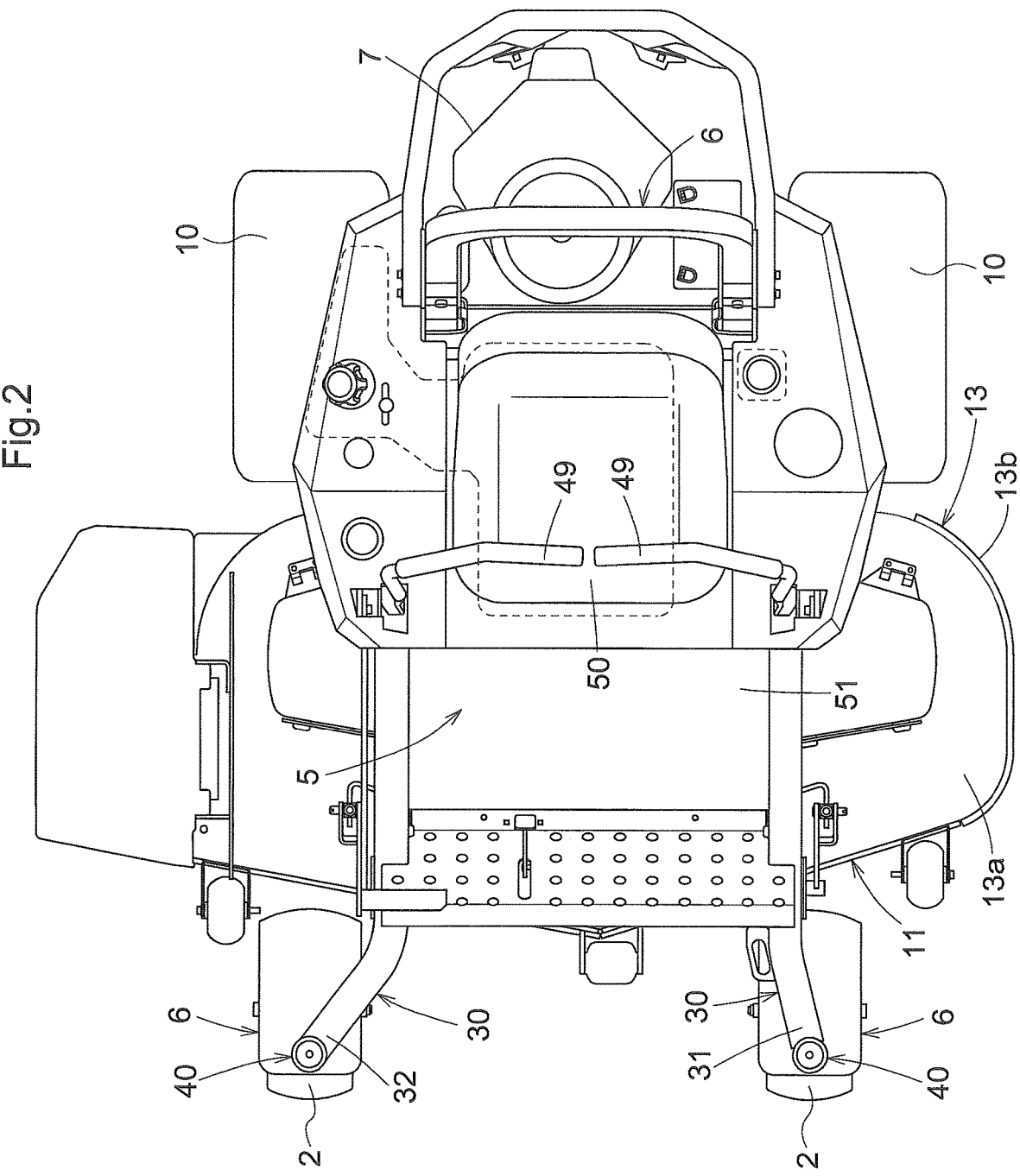
FIG. 2 is a plan view of the zero-turn mower.

This work vehicle is a grass mower called a zero-turn mower. FIG. 1 is a side view of the zero-turn mower and FIG. 2 is a plan view thereof. The zero-turn mower includes a pair of left and right caster wheels 2 and a pair of left and right rear wheels 10 which are rotatably driven independently of each other. By the front wheels 2 acting as caster wheels and the rear wheels 10, a vehicle body frame 3 is supported relative to the ground surface. Further, between the caster wheels 2 and the rear wheels 10, a mower unit 11 is suspended from the vehicle body frame 3 via a link mechanism 12. At a center area in the vehicle body front-rear direction of the vehicle body frame 3, a driving section 5 is disposed. In this driving section 5 of the vehicle body frame 3, a driver's seat 50 is provided. Steps 31 are mounted forwardly of the driver's seat 50 and a ROPS device 9 is provided rearwardly of the driving section 5. At a rear end area of the vehicle body frame 3, an engine 7 which can be a diesel engine or a gasoline engine is disposed.

On the front side of the engine 7, a transmission 8 is disposed. This transmission 8 includes a pair of left and right rear axle transmission units 81 to which power is transmitted from the engine 7 via e.g. a belt transmission mechanism. The left and right rear axle transmission unit 81 include their respective hydrostatic stepless speed changer mechanisms (to be referred to "HST" in short hereinafter) 42 which are operable independently of each other. Each HST 42 can change speed from a low speed to a high speed in a stepless manner and transmit the speed-changed power to the left and right rear wheels 10 under a forward rotational state of the engine (forward run) and reverse rotational state of the engine (reverse run). With this, a straight forward run is provided when both the left and rear wheels 10 are driven at an equal or substantially equal speed in the forward direction, whereas, a straight reverse run is provided when both the left and rear wheels 10 are driven at an equal or substantially equal speed in the reverse direction. Moreover, by making the speeds of the left and right rear wheels 10 different from each other, the vehicle body frame 3 can be turned in a desired direction. For instance, if either one of the left and right rear wheels 10 is driven at a low speed near a zero speed and the other rear wheel 10 is driven at a high speed to the forward or reverse side, a small turn can be provided. Still further, by driving the left and right rear wheels 10 in directions opposite to each other, the vehicle body 3 can be caused to make a spin turn about a substantial center portion of the left and right rear wheels 10 as the pivotal center.

Speed change operations for the left and right HST's 42 are effected by means of a pair of left and right speed changer levers 49 disposed on the opposed sides of the driver's seat 50. When the speed changer lever 49 is maintained at its front/rear neutral position, the corresponding HST is rendered into a neutral stopped state. When the speed changer lever 49 is operated to the forward side from the neutral position, there is realized a forward speed change. When it is operated to the rear side, a reverse speed change is realized.

The mower unit 11 includes a mower deck 13 consisting of a top plate 13*a* and a side plate 13*b*. Inside the mower deck 13, there is provided a rotary blade 14 rotatably driven by engine power.

The pair of left and right caster wheels 2 can freely change in their directions via pivotal movements thereof above respective vertical axes. So, a direction will be determined according to a running direction realized by driving of the left and right rear wheels 10.

A pair of left and right front wheel support beams 30 are formed at front end portions of the vehicle body frame 3. And, at a first end portion 31 which is on one side of the pair of left and right front wheel support beams 30, a left pivotal connecting unit 40 is provided. At a second end portion 32 which is on the other side of the pair of left and right front wheel support beams 30, a right pivotal connecting unit 40 is provided. Via the left pivotal connecting unit 40, a left caster bracket 6 is connected to the front wheel support beam 30 to be pivotable about a vertical axis. Via the right pivotal connecting unit 40, a right caster bracket 6 is connected to the front wheel support beam 30 to be pivotable about a vertical axis. And, each caster bracket 6 rotatably supports a caster wheel 2 via a caster axis 20.

Figure 3:
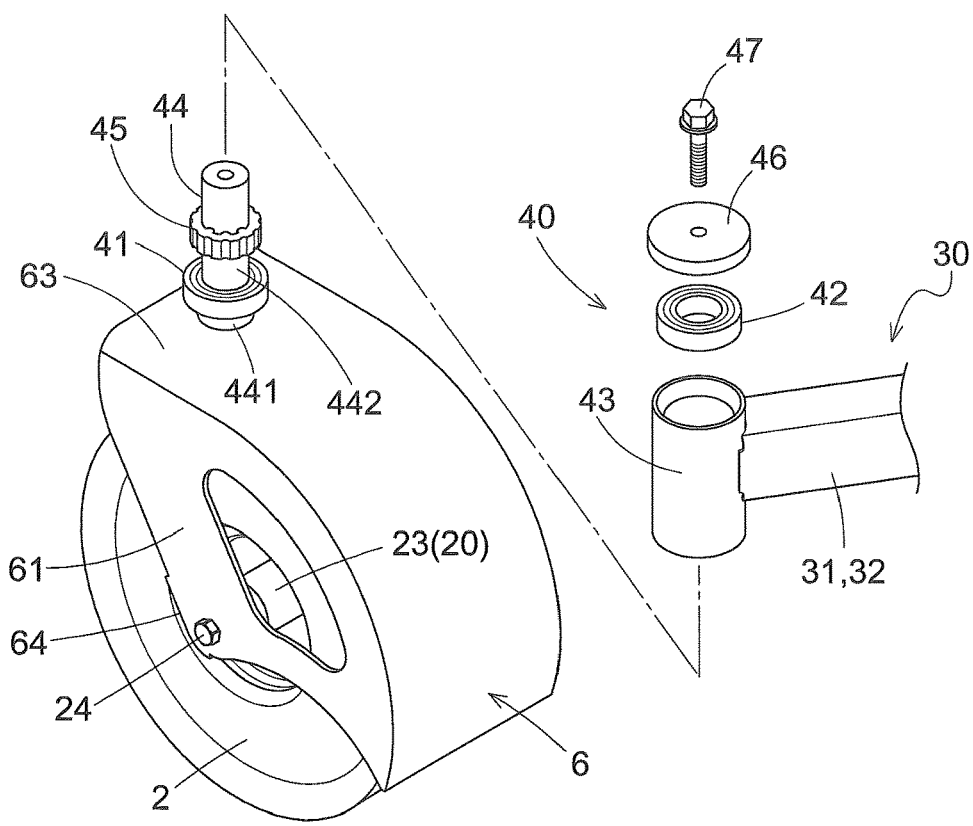
FIG. 3 is an exploded perspective view of a pivotal connecting unit.

As shown in FIG. 3, each pivotal connecting unit 40 includes a housing sleeve 43, a swivel post 44, a first bearing 41, a second bearing 42, and a rotation restricting member 45. The housing sleeve 43 is a cylindrical body whose outer circumferential face is connected by e.g. welding to the first end portion 31 and the second end portion 32 as the left end portion of the front wheel support beam 30. The swivel post 44 is disposed vertically on the ceiling face of the caster bracket 6 and consist of a base end portion 441 and a shaft body 442 extending from the base end portion. The base end portion 441 has a larger diameter than the shaft portion 442. The swivel post 44 is inserted into the housing sleeve 43. In order to rotatably support the swivel post 44 to the housing sleeve 43, at the lower end of the shaft body 442 of the swivel post 44, the first bearing 41 is attached and at the upper end of the shaft body 442, the second bearing 42 is attached. The base end portion 441 of the swivel post 44 functions as a seat for the first bearing 41. The second bearing 42 is held as a press washer 46 is fastened to the swivel post 44 by a bolt 47.

Figure 4:
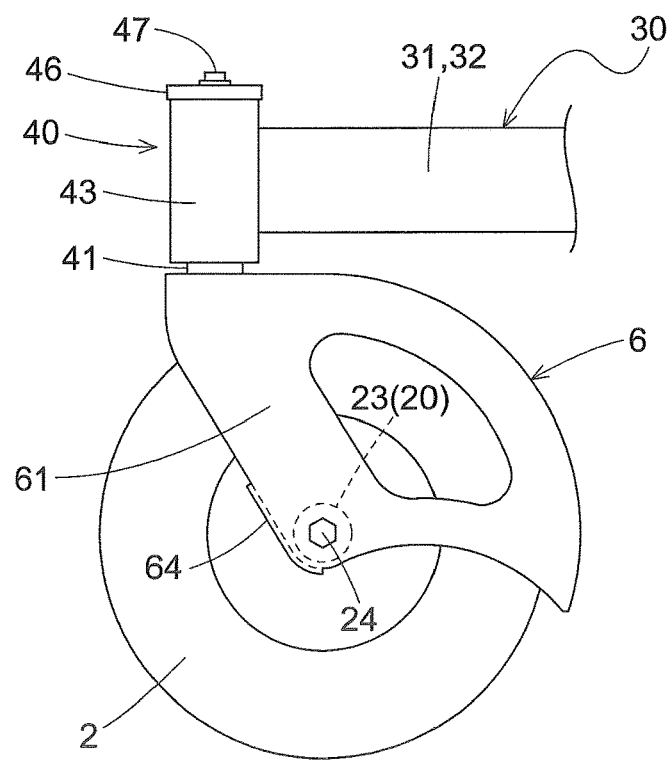
FIG. 4 is a side view of a caster wheel and a caster bracket.
Figure 5:
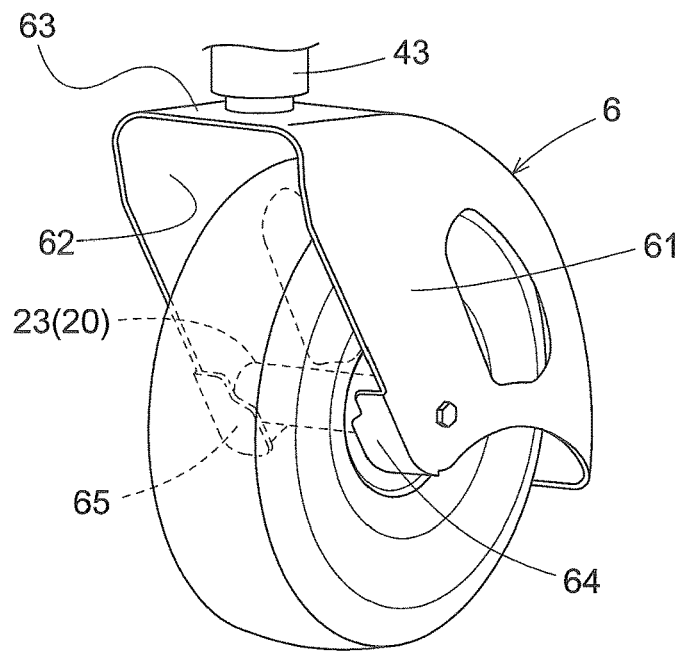
FIG. 5 is a perspective view of the caster wheel and the caster bracket.

As shown in FIG. 4 and FIG. 5, the caster bracket 6 consists of a left side wall 61, a right side wall 62, a top wall 63, a left cover portion 64 and a right cover portion 65. The left side wall 61 and the right side wall 62 respectively has a fan-like outer shape extending for a center angle of approximately 120 degrees about the caster axle 20. The lower portion of the left side wall 61 supports the left end portion of the caster axle 20 and the lower portion of the right side wall 62 supports the right end portion of the caster axle 20. The top wall 63 is bent to follow the outer circumferential face of the caster wheel 2 and connects an upper portion of the left side wall 61 to an upper portion of the right side wall 62. The left side wall 62, the right side wall 63 and the top wall 63 cooperate to cover the upper half portion of the caster wheel 2 except for its portion on the front side thereof. Namely, the substantially entire rear upper portion of the caster wheel 2 is covered by the caster bracket 6. As the top wall 63 extending from an upper side to a rear side of the caster wheel 2 serves as a shielding wall, it is possible to avoid inconvenience that during a grass cutting run, a foreign object such as a pebble, a grass/tree piece flung up by the caster wheel 2 will drop onto and become accumulated on the top plate 13*a* of the mower deck 13.

The left cover portion 64 extends from a front end lower side of the left side wall 61 toward a left side face of the caster wheel 2. Similarly, the right cover portion 65 extends from a front end lower side of the right side wall 62 toward a right side face of the caster wheel 2. The width of the left cover portion 64 and the width of the right cover portion 65 are set such that gaps formed respectively between them and the caster axle 20 may be minimal. Namely, the left cover portion 64 covers the left end portion of the caster axle 20 from its lower side to its front side; whereas the right cover portion 65 covers the right end portion of the caster axle 20 from its lower side to its front side. With this, during a grass cutting run, a high grass or a low tree piece or the like which may advance toward between the caster wheel 2 and the left and right side walls 61, 62 can be pressed by the left cover portion 64 and the right cover portion 65, so that contact between such high grass or low tree piece and the caster axle 20 can be effectively avoided.

Figure 6:
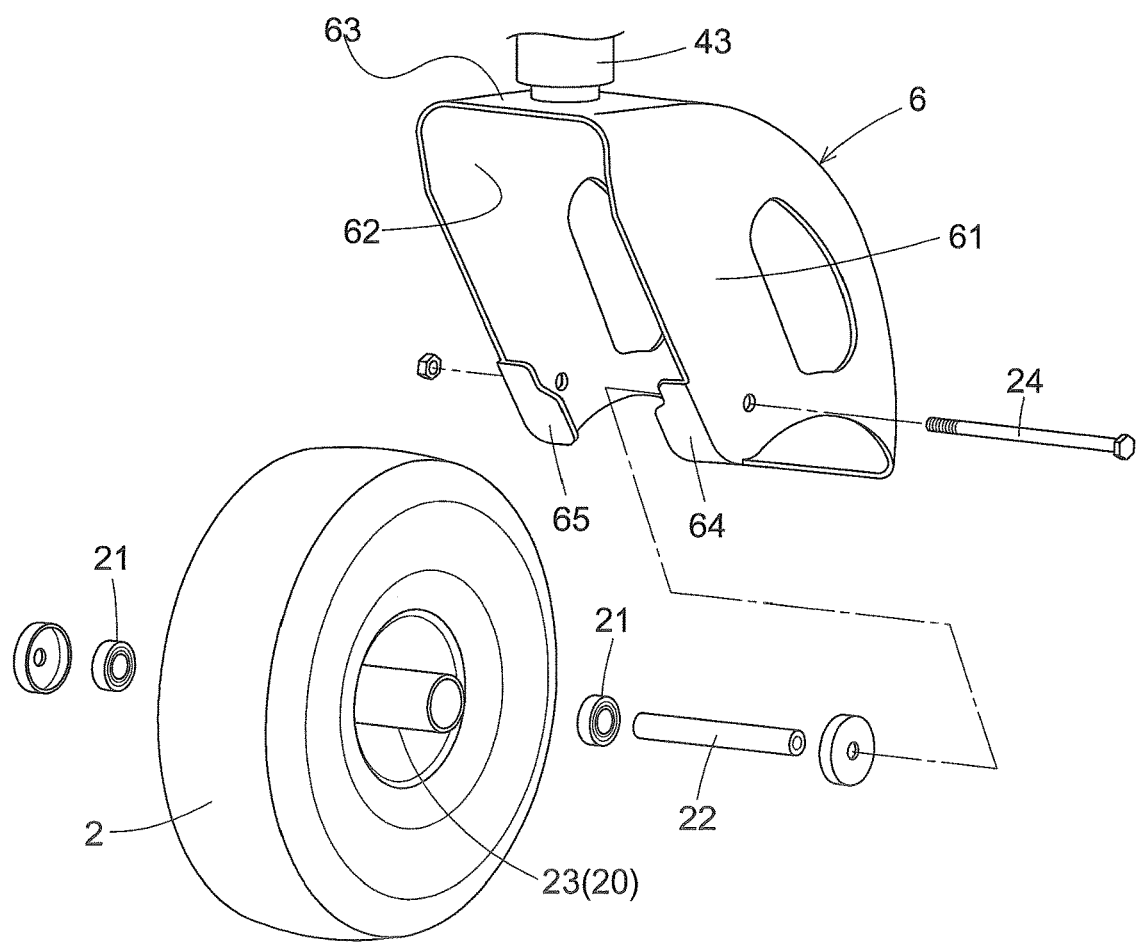
FIG. 6 is an exploded perspective view of a caster axle.

As shown in FIG. 6, the caster wheel 20 per se is known and includes an inner sleeve 22, an outer sleeve 23, a bearing 21 and a bolt 24. The bearing 21 is mounted between the inner sleeve 22 and the outer sleeve 23. The bolt 24 is inserted into holes formed at lower portions of the left side wall 61 and the right side wall 62 of the caster bracket 21 and the inner sleeve 22 and fastened and fixed thereto by a nut. If e.g. a foreign object hits the outer sleeve 23 and deforms this outer sleeve 23, such deformation will cause a trouble in its rotation relative to the inner sleeve 22 via the bearing 21. However, such hitting is prevented by the left cover portion 64 and the right cover portion 65.

In the foregoing embodiment, the caster bracket 6 has a side face approximating 120 degree fan-shape. Instead, as long as running can be ensured, a fan-shape of 180 degrees plus can be employed. The shape of the left cover portion 64 and the right cover portion 65 too can be other various shapes that can provide protection of at least a front side exposed portion of the caster axle 20 between the caster bracket 6 and the caster wheel 2.

In the foregoing embodiment, a zero-turn mower was described as an example of work vehicle. However, the present invention is applicable also to other various kinds of work vehicles such as a grass mower, a tractor, a transporting vehicle, etc.

Incidentally, the arrangement disclosed in the above embodiment (including the further embodiments) can be used in combination with the arrangements of the further embodiments as long as no contraction occurs resulting from such combination. Further, it is also understood that the embodiments disclosed in the above detailed description are only exemplary, so embodiments of the present invention are not limited thereto, but various modifications can be made thereto appropriately as long as no departure from the object of the invention occurs.

The invention claimed is:

1. A work vehicle comprising:
a driving rear wheel unit;
a front frame extending in a vehicle body transverse direction;
a pair of left and right pivotal connecting units provided on the front frame;
a caster wheel;
a caster axle; and
a caster bracket connected to the pivotal connecting unit, the caster bracket including:
a left side wall that supports a left end portion of the caster axle;
a right side wall that supports a right end portion of the caster axle;
a top wall extending rearwards from the upper side of the caster wheel and interconnecting the left side wall and the right side wall;
a left cover portion configured to prevent contact between grass and the caster axle and being arranged below a front edge of the left side wall and that extends from the left side wall to a left side face of the caster wheel for covering the left side face of the caster axle; and
a right cover portion configured to prevent contact between grass and the caster axle and being arranged below a front edge of the right side wall and that extends from the right side wall to a right side face of the caster wheel for covering the right side face of the caster axle,
wherein all of the left side wall, the right side wall, and the top wall are formed of a single piece,
wherein, when the caster wheel is facing a front travel direction, the top wall, the front edge of the left side wall and the front edge of the right side wall define a U-shaped front open area located behind a forward most portion of the caster wheel, and
wherein the left cover portion is perpendicular to the left side wall and extends orthogonally inward from the left side wall to a left cover portion terminal end, and
wherein the right cover portion is perpendicular to the right side wall and extends orthogonally inward from the right side wall to a right cover portion terminal end.

2. The work vehicle of claim 1, wherein the caster bracket covers the caster wheel over an area having a center angle of 90 degrees plus.

3. The work vehicle of claim 1, wherein the left cover portion and the right cover portion extend to cover the lower side to the front side of the caster axle.

4. The work vehicle of claim 1, wherein the top wall is sized to extend beyond the caster wheel rearwards as seen in a plan view.

5. The work vehicle of claim 1, wherein a mower unit comprising a top plate and a side plate is mounted between the driving rear wheel unit and the caster wheel, and the caster bracket is configured to prevent an object flung up by the caster wheel from reaching the top plate.

6. The work vehicle of claim 1, wherein all of the left side wall, the right side wall, the top wall, the left cover portion, and the right cover portion, are formed of a single piece.

7. A work vehicle comprising:
a driving rear wheel unit;
a front frame extending in a vehicle body transverse direction;
a mower deck;
a pair of left and right pivotal connecting units provided on the front frame;
a caster wheel;
a caster axle; and
a caster bracket configured to prevent foreign objects from being flung up onto the mower deck and being connected to the pivotal connecting unit, the caster bracket including:
a left side wall provided with an opening therein that receives a left end portion of the caster axle so that the caster axle is supported by the left side wall;
a right side wall provided with an opening therein that receives and supports a right end portion of the caster axle so that the caster axle is supported by the left side wall;
a top wall extending rearwards from the upper side of the caster wheel and interconnecting the left side wall and the right side wall;
a left cover portion configured to prevent contact between grass and the caster axle and being arranged below a front edge of the left side wall and that extends from the left side wall to a left side face of the caster wheel for covering the left side face of the caster axle;
a right cover portion configured to prevent contact between grass and the caster axle and being arranged below a front edge of the right side wall and that extends from the right side wall to a right side face of the caster wheel for covering the right side face of the caster axle, and
wherein the left cover portion is perpendicular to the left side wall and extends orthogonally inward from the left side wall to a left cover portion terminal end, and
wherein the right cover portion is perpendicular to the right side wall and extends orthogonally inward from the right side wall to a right cover portion terminal end.

8. The work vehicle of claim 7, wherein the caster bracket covers the caster wheel over an area having a center angle of 90 degrees plus.

9. The work vehicle of claim 7, wherein the left cover portion and the right cover portion extend to cover the lower side to the front side of the caster axle.

10. The work vehicle of claim 7, wherein the top wall is sized to extend beyond the caster wheel rearwards as seen in a plan view.

11. The work vehicle of claim 7, wherein a mower unit comprising a top plate and a side plate is mounted between the driving rear wheel unit and the caster wheel, and the caster bracket is configured to prevent an object flung up by the caster wheel from reaching the top plate.

12. The work vehicle of claim 7, wherein all of the left side wall, the right side wall, the top wall, the left cover portion, and the right cover portion, are formed of a single piece.

13. A work vehicle comprising:
- a driving rear wheel unit;
- a front frame extending in a vehicle body transverse direction;
- a mower deck;
- a pair of left and right pivotal connecting units provided on the front frame;
- a caster wheel;
- a caster axle; and
a caster bracket configured to prevent foreign objects from being flung up onto the mower deck and being connected to the pivotal connecting unit, the caster bracket including:
- a left side wall provided with an opening therein that receives a left end portion of the caster axle so that the caster axle is supported by the left side wall;
- a right side wall provided with an opening therein that receives and supports a right end portion of the caster axle so that the caster axle is supported by the left side wall;
- a top wall extending rearwards from the upper side of the caster wheel and interconnecting the left side wall and the right side wall;
- a left cover portion configured to prevent contact between grass and the caster axle and:
- being arranged in front of and adjacent to the caster axle and below a front edge of the left side wall; and
- that extends from the left side wall to a left side face of the caster wheel for covering the left side face of the caster axle; and
- a right cover portion configured to prevent contact between grass and the caster axle and:
- being arranged in front of and adjacent the caster axle and below a front edge of the right side wall; and
- that extends from the right side wall to a right side face of the caster wheel for covering the right side face of the caster axle,
- wherein the left side wall, the right side wall, and the top wall cover substantially an entire rear portion of the caster wheel,
- wherein, when the caster wheel is facing a front travel direction, the top wall, the left side wall and the right side wall define a U-shaped front open area located behind a forward most portion of the caster wheel, and
- wherein the left cover portion is perpendicular to the left side wall and extends orthogonally inward from the left side wall to a left cover portion terminal end, and
- wherein the right cover portion is perpendicular to the right side wall and extends orthogonally inward from the right side wall to a right cover portion terminal end.

14. The work vehicle of claim 13, wherein the caster bracket covers the caster wheel over an area having a center angle of 90 degrees plus.

15. The work vehicle of claim 13, wherein the left cover portion and the right cover portion extend to cover the lower side to the front side of the caster axle.

16. The work vehicle of claim 13, wherein the top wall is sized to extend beyond the caster wheel rearwards as seen in a plan view.

17. The work vehicle of claim 13, wherein a mower unit comprising a top plate and a side plate is mounted between the driving rear wheel unit and the caster wheel, and the caster bracket is configured to prevent an object flung up by the caster wheel from reaching the top plate.

18. The work vehicle of claim 13, wherein all of the left side wall, the right side wall, the top wall, the left cover portion, and the right cover portion, are formed of a single piece.

* * * * *